Dec. 18, 1951  W. E. ELDRED  2,579,180
TANDEM-WHEEL SHOCK ABSORBING AIRCRAFT LANDING GEAR
Filed March 15, 1949  2 SHEETS—SHEET 1
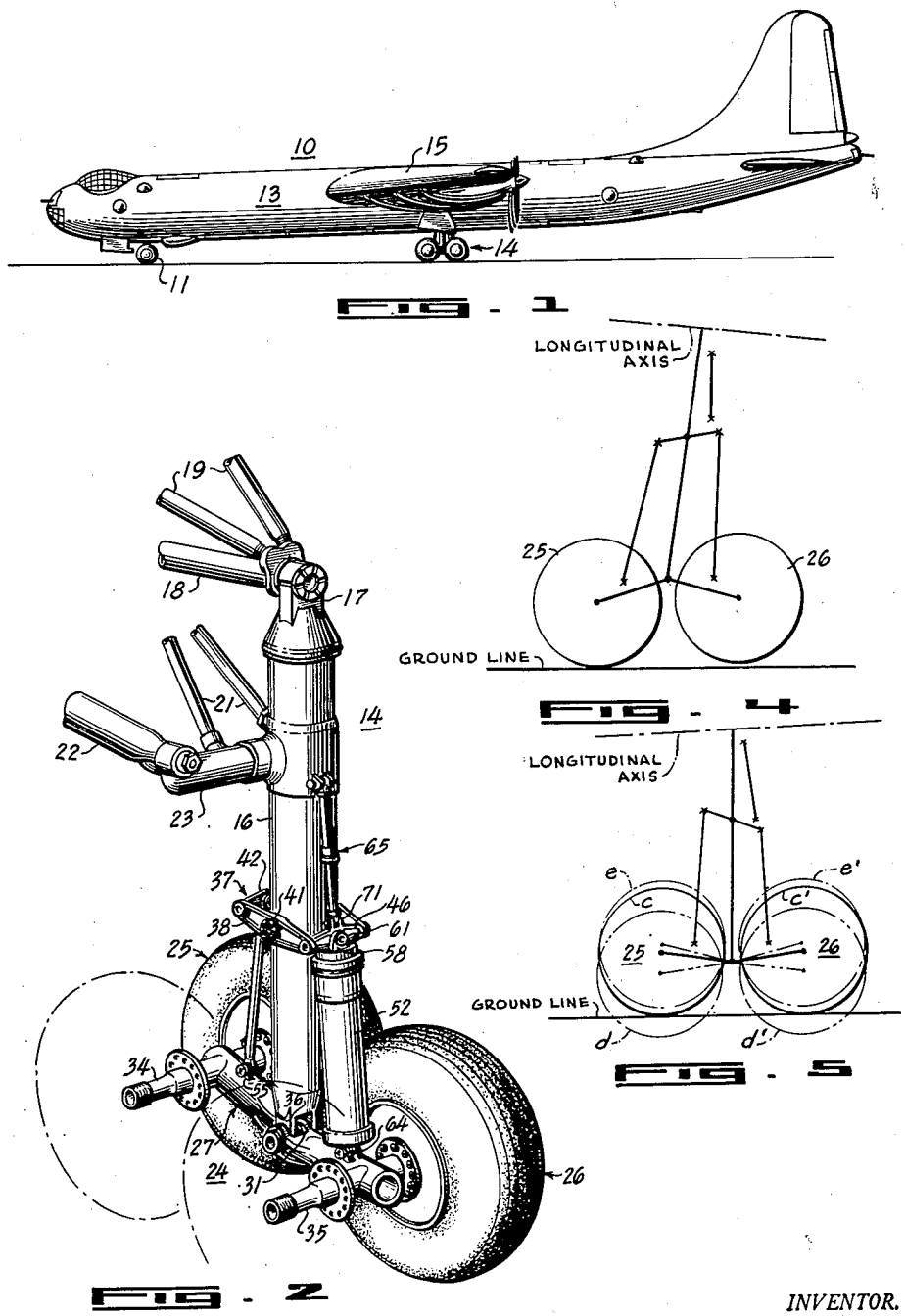
INVENTOR.
Wendell E. Eldred
BY
Walter J. Jason
ATTORNEY Dec. 18, 1951 W. E. ELDRED 2,579,180
TANDEM-WHEEL SHOCK ABSORBING AIRCRAFT LANDING GEAR
Filed March 15, 1949 2 SHEETS—SHEET 2
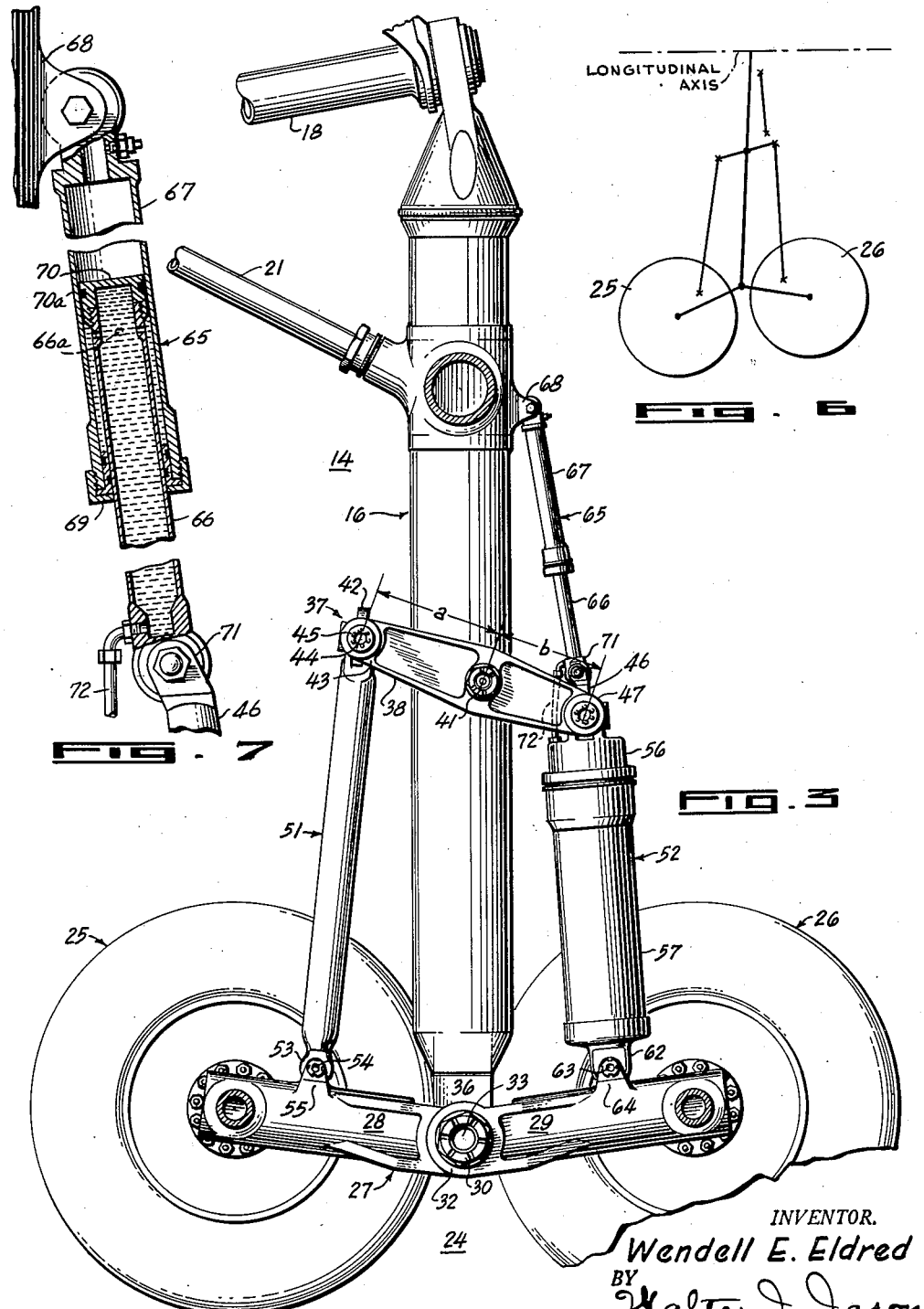
INVENTOR.
Wendell E. Eldred
BY
Walter J. Jason
ATTORNEY Patented Dec. 18, 1951 2,579,180

UNITED STATES PATENT OFFICE 2,579,180

TANDEM-WHEEL SHOCK ABSORBING AIRCRAFT LANDING GEAR

Wendell E. Eldred, Fort Worth, Tex., assignor to Consolidated Vultee Aircraft Corporation, San Diego, Calif., a corporation of Delaware Application March 15, 1949, Serial No. 81,548

18 Claims. (Cl. 244—104)

This invention relates to landing or alighting gear for aircraft, and more particularly to landing gear of the multi-wheel shock absorbing type.

An object of the present invention is to provide an improved construction for a multi-wheel landing gear wherein the loads applied to the wheels are effectively absorbed.

Another object of the invention is the provision of a novel form of four-wheel landing gear having the wheels thereof arranged in pairs, relatively movable one pair to the other, and with said pairs of wheels having operatively associated therewith an equalizer assembly for a desirable distribution of shock loads encountered by the landing gear.

Another object of the invention resides in the provision of an improved form of multi-wheeled landing gear for unusually large aircraft, embodying four wheels arranged in tandem and in pairs to effect a plurality of contact points for the distribution, over a wide area of aircraft runway, of the impact loads induced by the mass inertia of a landing aircraft, and by its static weight, and thereby permit such unusually large aircraft to land on runways of normal construction.

A further object of the invention lies in providing a four-wheel landing gear assembly having an improved construction wherein pairs of relatively movable dual wheel assemblies are arranged in tandem with a novel interconnection between the pairs of dual wheel assemblies comprising an equalizer and a common shock absorber for effecting distribution of loads upon the wheels.

A still further object of the invention is to employ in a four-wheel landing gear of the type above described means for maintaining desired related positions of the pairs of dual wheel assemblies in tandem.

Other objects and features of the present invention will be readily apparent to those skilled in the art from the following specification and appended drawings wherein is illustrated a preferred form of the invention, and in which:

Figure 1 is a view in side elevation of an airplane utilizing four-wheel main landing gear assemblies.

Figure 2 is a perspective view of the four-wheel landing gear in accordance with the present invention.

Figure 3 is a side elevational view, enlarged, of the landing gear of the present invention.

Figure 4 is a diagrammatic illustration of the landing gear depicting the positions of the fore and aft wheel assemblies relative to the ground line at the instant of landing.

Figure 5 is a view diagrammatically illustrating various relative positions of axle centers and peripheries of the landing gear wheels assumed under static load and which may occur when the landing wheels in moving over a runway encounter depressions or ridges therein.

Figure 6 is a diagrammatic view of the relative position of the fore and aft wheel assemblies with respect to the longitudinal axis of the airplane when in level flight.

Figure 7 is an enlarged fragmentary view with the positioning jack illustrated in vertical section.

Having particular reference now to the drawings there is illustrated in Figure 1 an aircraft 10 having retractable tricycle alighting gear provided thereon comprised of a nose wheel 11 supported by the fuselage 13 and a pair of main landing gear assemblies 14 (only one of which is shown) disposed one assembly on each side of the fuselage 13, each assembly being operatively connected to an airfoil 15.

Since the pair of main landing gear assemblies 14 are similar in construction and operation it is therefore necessary only to describe one assembly. Figures 2 and 3 fully illustrate a main landing gear assembly 14 built in accordance with the invention; and as shown the main landing gear assembly 14 comprises a landing gear strut or rigid main column 16, the upper end 17 of which is adapted to be suitably connected to the airfoil 15 by a pivot shaft 18 and associated truss tubes 19. To assist in the proper locating and maintaining of the landing gear strut 16 in a vertical position there is provided a pair of drag struts 21 and a conventional side brace 22 secured to the main strut 16 through a transverse strut 23.

At the outer or lower end of the landing gear strut 16 there is located a main landing gear wheel carriage 24. The main landing gear wheel carriage 24 comprises two sets of dual wheel assemblies 25 and 26, horizontally spaced and mounted in tandem one set at each end of a generally horizontally disposed axle arrangement 27. The axle arrangement 27 consists of a forward axle beam member 28 and an aft axle beam member 29, the identical axle beam members 28 and 29 being hingedly connected at their inner ends by a joint 30 effected by the interfitting of a clevis fork 31 on forward axle beam member 28 with a clevis fork 32 formed on the rearwardly extending axle beam member 29. A pivot pin 33 interconnects the clevis blade 31 and the clevis fork 32 to complete the hinge joint 30.

A transverse axle shaft 34 is provided at the outer end of forward axle beam member 28 rotatably to support the dual wheel assembly 25. A similar transverse shaft 35 is located at the outer end of rearwardly extending axle beam member 29 for rotatably supporting the second set of dual wheels 26.

Upon the lower end of landing gear strut 16 is formed a pair of downwardly extending blade portions 36 through which the landing gear strut 16 is pivotally connected by pivot pin 33 to the axle arrangement 27 at hinge joint 30.

Carried by the landing gear strut 16 between the extremities thereof is an equalizer assembly 37 comprising a pair of spaced, parallel rocker-arm members 38, which members 38 are disposed one on each side of strut 16 and are pivotally mounted on a pivot pin 41 which is suitably supported by the landing gear strut 16. It is noted that the pivot pin 41 is located on the landing gear strut 16 aft of the longitudinal axis thereof and toward the rear dual wheel assembly 26. A transverse tie beam 42 interconnects, for common movement, the forward free ends 43 of rocker arm members 38, having trunnion-like ends 44 which are received within suitable bearings 45 provided at the free ends 43. A like transverse tie beam 46 similarly interconnects the aft free ends 47 of the rocker arm members 38. The quadrilateral arrangement formed by the rocker arm members 38 and the transverse tie beams 42 and 46 constitutes, in effect, a walking beam member.

Figure 3 best illustrates a structural feature of the equalizer assembly 37 to which attention is here directed; this feature consists of the unequal spacing of the points of connection to the landing gear strut 16 of the rocker arms 38. As shown the distance $a$ from pivot pin 41, which mounts rocker arms 38, to the connection of transverse tie beam 42 to forward ends 43 of rocker arms 38 is greater than the distance $b$ from the same pivot pin 41 to the connection of transverse tie beam 46 at the aft ends 47 of rocker arms 38. The purpose of this structural arrangement will be hereinafter fully described.

Interconnection between the equalizer assembly 37 and the axle arrangement 27 is provided through an elongated rigid fixed link member 51 and a conventional oleo shock strut 52. The link member 51 is suitably connected at its upper extremity to the center of forward transverse tie beam 42, and has formed at its lower end a flat, downwardly projecting portion 53 which is connected by a pivot pin 54 to spaced upwardly extending lugs 55 provided on the upper periphery of forward axle beam 28. The oleo shock strut 52 is of usual construction comprising an upper or cylinder portion 56 and a piston portion 57 adapted to telescope within cylinder portion 56. Compacting or collapsing of the shock strut 52 under applied loads is resiliently opposed by a hydraulic fluid metering means (not shown) within the cylinder 56 and which may be of any desired conventional construction. Connecting lugs 58 formed on the upper end of cylinder 56 are joined to the center of transverse tie beam 46 through a pivot pin 61 thereby pivotally coupling the upper end of shock strut 52 to the equalizer assembly 37. This pivotal connection of the shock strut 52 allows a slight adjustable rotation of the shock strut about the axial center of pivot pin 61 thereby to divert any bending movements from the shock strut 52, such as may be induced by side loads on the landing gear. The lower end of the piston portion 57 of shock strut 52 is provided with a blade portion 62 which is pivotally connected, through pivot pin 63, to a pair of spaced upwardly projecting lugs 63 carried by the aft axle beam member 29 upon the upper periphery thereof.

Interconnecting the aft transverse tie beam 46 and the landing gear strut 16 is a positioning or centering jack 65 of conventional construction, comprising a piston portion 66 arranged for telescoping movement within cylindrical portion 67. Cylinder 67 contains a suitable sealing assembly 69 fixed at the lower end thereof, and through which the stem of piston 66 is slidably movable. Head 70 of piston 66 is provided with a peripheral groove to receive a usual elastic composition packing ring 70a. The stem of piston 66 is completely filled with liquid, and liquid is adapted to lie within cylinder 67 in surrounding relation to the exterior wall of the stem of piston 66. Communication between the interior of the stem of piston 66 and the exterior thereof to allow flow of fluid therebetween is provided through a damping orifice 66a in the wall surface of piston 66. It is understood that the present invention is not directed to the particular construction of centering jack 65 and that any jack adapted to operate as the jack described is contemplated for use in the invention. To mount positioning jack 65 in position cylindrical portion 67 is pivotally connected at its upper end to attachment lugs 68 provided upon landing gear strut 16, and the lower end of piston 66 is pivotally secured to a fork ear fitting 71 located on the upper center edge of aft tie beam 46.

A hydraulic interconnection is effected between the shock strut 52 and the centering jack 65 by means of a flexible conduit 72 which is appropriately connected at its ends to usual fittings provided on the centering jack 65 and the cylinder 56. The centering jack 65 is operative after take-off to properly position the landing gear for retraction. The positioning of the landing gear is accomplished through pressure conveyed from the oleo cylinder 56 by way of the conduit 72 to the positioning jack 65 where this pressure is adapted to act against the rear of head 70 of piston 66 to cause the jack to contract. Contraction of the jack 65 absorbs the lowering effect which the extension of shock strut 52 otherwise would have upon the rear dual wheel assembly and rotates the equalizer assembly 37 to permit the forward wheel assembly 25 to drop into neutral position, which is the position shown in Figure 6.

When the landing gear 14 is extended for landing but the airplane is still in level flight, the position of the landing gear 14 relative to the longitudinal axis of the airplane fuselage is illustrated in Figure 6 wherein it is apparent that the forward dual wheel set 25 lies disposed lower than aft wheel set 26. Figure 4 illustrates the normal position of the landing gear 14 relative to the ground at the instant that contact is made with the ground, where regardless of the tilted attitude assumed by the airplane as it lands the forward dual wheel set 25 touches the ground slightly ahead of the aft set 26. Thus the forward wheel set 25 being located further away from the airplane is adapted to be set on the ground first.

When the airplane is parked or is taxiing on a level runway, the dual wheel sets 25 and 26 occupy the position c and c' relative to one another and to the ground line (shown in solid lines in Figure 5), this being called the static or normal load position. The arrangement of the equalizer assembly 37 and the hinged connection of the column 16 to the axle beams 28 and 29 permits relative movement of the wheel sets 25 and 26 one to the other to care for unevenness in the runway surface, with the wheel sets 25 and 26 being adapted to extend to positions d and d' or to be raised to positions e and e' (all shown in chain lines in Figure 5) to accommodate a set of wheels rolling over elevated obstructions or through depressions present in the landing field.

In a landing gear 14 having an arrangement of elements as hereinabove described impact loads applied to the rear wheel set 26 are transmitted directly to the shock strut 52 to be absorbed thereby. Impact loads acting on the forward wheel set 25 are cared for by transmittal thereof through the fixed link 51 and the equalizer assembly 37 to the shock strut 52.

To lessen the possibility of the rear wheel set 26 skidding the distance b from the connection of rear transverse tie beam 46 to the pivot 41 of the rocker arms 38 has been made shorter than the distance a from pivot 41 to the connection of the transverse tie beam 46. Under static conditions this unequal spacing will obviously result in unequal loadings on the wheel sets 25 and 26 with the greater vertical load being applied to the rear wheel set 26. The ratio of these distances is so fixed that the vertical loads on both sets of wheels become increasingly equalized as deceleration due to wheel braking is produced. On reaching of a predetermined value of deceleration, the vertical loads on the wheel sets 25 and 26 become equalized and it has been found that any tendency for the wheels to skid has become substantially eliminated.

Landing of large aircraft have posed a very troublesome problem as regards the construction of landing fields. Certain aircraft designs, in recent years, have attained such heavy weights that the usual airfield surfaces are unable to withstand the concentrated loads of such aircraft if the usual single wheel landing gear is employed. With the present invention which utilizes dual wheel sets arranged in tandem the airplane load is distributed over a number of contact points and a substantial area and existing airfields are then able to accommodate the aircraft without precautions being taken to increase the structural depth of such airfields. Additionally the novel arrangement of elements in the landing gear 14 of the present invention permits the great loads applied to a landing gear by large aircraft to be effectively assimilated without damage either to the landing gear or to the aircraft.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. In an aircraft landing gear, a main strut, a wheel carriage mounted on said main strut, said wheel carriage comprising a generally horizontal axle assembly pivotally connected, intermediate its ends, to said main strut and having wheel means rotatably supported at the extremities thereof, pivot means rigidly affixed to said main strut a load transmitting assembly mounted for pivotal movement on said pivot means, a rigid link member disposed at one side of said main strut interconnecting said load transmitting assembly and said axle assembly, and a shock absorbing strut on the opposite side of said main strut interconnecting said load transmitting assembly and said axle assembly.

2. Aircraft landing gear construction comprising a columnar strut member, a pair of axle beam members disposed transversely of said columnar strut member and hingedly interconnected at their inner ends to one another and to the lower end of said strut member, wheel means rotatably carried at the free ends of said axle beam members, a shock absorbing strut operatively connected to one of said pair of axle beam members, and means including pivoted means mounted on a fixed pivot carried by said strut member for transmitting shock loads from the other of said pair of axle beam members to said shock absorbing strut.

3. In a landing device for aircraft, a main strut, a pair of axle beam members hingedly interconnected at their inner ends to one another and to said main strut, wheel means rotatably carried by said axle beam members, pivot means rigidly affixed to said main strut a load transmitting assembly mounted for pivotal movement on said pivot means and spaced from the connection of said axle beam members to said main strut, a rigid link member interconnecting said load transmitting assembly and one of said axle beam members, and a shock absorbing strut interconnecting said load transmitting assembly and the other of said axle beam members.

4. In a landing gear for aircraft, the combination of a main strut, a pair of relatively movable axle beam members, each of said axle beam members having one end pivotally connected to said main strut at its lower end and having wheel means rotatably supported at the other end, a rigid link member having one end pivotally connected to one of said axle beam members intermediate the ends thereof, a shock absorbing device pivotally connected at one end to the other of said axle beam members and between the ends thereof, and means interconnecting the other ends of said rigid link member and said shock absorbing device, said means comprising pivot means rigidly affixed to said main strut and elongated means pivotally supported between the ends thereof upon said pivot means and extending to each side of the main strut to be connected on one side to said rigid link member and on the other to said shock absorbing device.

5. Landing gear for aircraft comprising a strut adapted for connection to the aircraft, a generally horizontal axle assembly pivotally supported, intermediate its ends, by said strut, horizontally spaced wheel means rotatably carried by said axle assembly, a rigid link member disposed on one side of said strut and having one end connected to said axle assembly, a shock absorbing strut on the opposite side of said strut also having one end connected to said axle assembly, and a load transmitting assembly interconnecting the other ends of said rigid link member and said shock absorbing strut, said load transmitting assembly comprising a pair of rocker arm members pivotally connected, intermediate their ends, to said strut and a pair of transverse tie beam members joining the free ends of said rocker arm members for common movement.

6. An aircraft landing device comprising a strut adapted for connection to the aircraft, an axle assembly pivotally supported, intermediate its ends at the lower end of said strut and transversely of said strut, horizontally spaced wheel means rotatably carried by said axle assembly, a load transmitting assembly pivotally mounted on said strut spaced from the connection thereto of said axle assembly, said load transmitting device comprising a pair of lever members, in parallel, pivotally supported, intermediate their ends, on said strut, and one on each side thereof and a pair of transverse tie beam members joining the free ends of said lever members for common movement, a rigid link member disposed forward of said strut having one end pivotally connected to said axle assembly and the other end connected to a tie beam of said load transmitting assembly, and a shock absorbing strut mounted aft of said strut, said shock absorbing strut comprising telescoping members, with one of said members having a pivotal connection with said axle assembly, and the other member having a pivotal connection with the second of said tie beams of said load transmitting assembly.

7. An aircraft landing device comprising a strut adapted for connection to the aircraft, a pair of relatively movable axle beam members, each of said axle beam members having one end pivotally connected to said strut at its lower end and having wheel means rotatably supported thereon spaced from said connection, a load transmitting assembly pivotally mounted on said strut, said load transmitting device comprising a pair of lever members, in parallel, pivotally supported, intermediate their ends on said strut, one on each side thereof and a pair of transverse tie beam members joining the free ends of said lever members for common movement, a rigid link member disposed forward of said strut having one end pivotally connected to one of said axle beam members and the other end connected to a tie beam of said load transmitting assembly, and a shock absorbing strut mounted aft of said strut comprising telescoping members, with one of said telescoping members having a pivotal connection with the other of said axle beam members, and the other telescoping member having a pivotal connection with the second of said tie beams of said load transmitting assembly.

8. In an aircraft landing gear, a main strut, a wheel carriage mounted to said main strut, said wheel carriage comprising a generally horizontal axle assembly pivotally connected, at a point between its ends, to said main strut and having wheel means rotatably supported at each end thereof, a load transmitting assembly, pivot means rigidly affixed to said strut for pivotally mounting said load transmitting assembly on said strut spaced from the longitudinal axis of the strut, a rigid link member disposed on one side of said main strut interconnecting said load transmitting assembly and said axle assembly, and a shock absorbing strut on the opposite side of said main strut interconnecting said load transmitting assembly and said axle assembly.

9. Aircraft landing gear construction comprising a columnar strut member, a pair of axle beam members disposed transversely of said columnar strut member and hingedly interconnected at their inner ends to one another and to the lower end of said strut member, wheel means rotatably carried at the free ends of said axle beam members, a shock absorbing strut operatively connected to one of said pair of axle beam members, and means carried by said strut member for transmitting shock loads from the other of said pair of axle beam members to said shock absorbing strut, said shock transmitting means including means pivotally mounted on said strut spaced from the longitudinal axis thereof.

10. In a landing gear for aircraft, the combination of a main strut, a pair of relatively movable axle beam members, each of said axle beam members having one end pivotally connected to said main strut at its lower end and having wheel means rotatably supported at the other end, a rigid link member having one end pivotally connected to one of said axle beam members intermediate the ends thereof, a shock absorbing device pivotally connected at one end to the other of said axle beam members and between the ends thereof, and means interconnecting the other ends of said rigid link member and said shock absorbing device, said means comprising elongated means pivotally supported between the ends thereof upon said main strut and extending beyond each side of the main strut to be connected on one side to said rigid link member and on the other side to said shock absorbing device, said load transmitting assembly comprising a pair of lever members, pivot means for mounting said lever members on said strut for pivotal movement about an axis transverse to and spaced from the longitudinal axis of the strut, said pivot means connecting to said lever members off-center of the lengths thereof.

11. In a landing gear for aircraft, the combination of a main strut, a pair of relatively movable axle beam members, each of said axle beam members having one end pivotally connected to said main strut at its lower end and having wheel means rotatably supported at the other end, a rigid link member having one end pivotally connected to one of said axle beam members intermediate the ends thereof, a shock absorbing device pivotally connected at one end to the other of said axle beam members and between the ends thereof, and means interconnecting the other ends of said rigid link member and said shock absorbing device, said means comprising elongated means, and pivot means operatively connected to said elongated means off-center thereof for pivotally mounting the elongated means upon said main strut for pivotal movement about an axis spaced from the longitudinal axis of the strut.

12. Landing gear for aircraft comprising a strut adapted for connection to the aircraft, a generally horizontal axle assembly pivotally supported, intermediate its ends, by said strut, horizontally spaced wheel means rotatably carried by said axle assembly, a rigid link member disposed on one side of said strut and having one end connected to said axle assembly, a shock absorbing strut on the opposite side of said strut also having one end connected to said axle assembly, and a load transmitting assembly interconnecting the other ends of said rigid link member and said shock absorbing strut, said load transmitting assembly comprising a pair of rocker arm members, pivot means operatively connected to said rocker arm members off-center thereof for pivotally mounting the rocker arm members upon said strut for pivotal movement about an axis transverse to and spaced from the longitudinal axis of the strut, and a pair of transverse tie beam members joining the free ends of said rocker arm members for common movement.

13. A landing gear for aircraft comprising a strut adapted for connection to the aircraft, an axle assembly pivotally supported, intermediate its ends at the lower end of said strut and transversely of said strut, horizontally spaced wheel means rotatably carried by said axle assembly, a load transmitting assembly pivotally mounted on said strut spaced from the connection thereto of said axle assembly, said load transmitting device comprising a pair of lever members disposed one on each side of said strut, pivot means operatively connected to said lever members off-center thereof for pivotally mounting, in parallel, said lever members upon said strut for pivotal movement about an axis transverse to and spaced from the longitudinal axis of said strut, and a pair of transverse tie beam members joining the free ends of said lever members for common movement, a rigid link member disposed forward of said strut having one end pivotally connected to said axle assembly and the other end connected to a tie beam of said load transmitting assembly, and a shock absorbing strut mounted aft of said strut comprising telescoping members, with one of said members having a pivotal connection with said axle assembly, and the other member having a pivotal connection with the second of said tie beams of said load transmitting assembly.

14. An aircraft landing gear comprising a strut adapted for connection to the aircraft, a pair of relatively movable axle beam members, each of said axle beam members having one end pivotally connected to said strut at its lower end and having wheel means rotatably supported thereon, a load transmitting assembly pivotally mounted on said strut, said load transmitting device comprising a pair of lever members disposed one on each side of said strut, pivot means mounted on said strut at a point spaced from the longitudinal axis of the strut, said pivot means being operatively connected to said lever members off-center thereof for pivotally mounting, in parallel, said lever members upon said strut, and a pair of transverse tie beam members joining the free ends of said lever members for common movement, a rigid link member disposed forward of said strut having one end pivotally connected to the axle beam member which extends forwardly from said strut and the other end connected to a tie beam of said load transmitting assembly, and a shock absorbing strut mounted aft of said strut comprising telescoping members, with one of said telescoping members having a pivotal connection with the axle beam member which extends rearwardly from said strut connection, and the other telescoping member having a pivotal connection with the second of said tie beams of said load transmitting assembly.

15. A landing gear for aircraft comprising a strut adapted for connection to the aircraft, a pair of relatively movable axle beam members hingedly interconnected at their inner ends to one another and to said strut, wheel means rotatably carried by said axle beam members, a load transmitting assembly pivotally mounted on said strut and spaced from the connection thereto of said axle beam members, means interconnecting said load transmitting assembly and an axle beam member extending forwardly from the strut, a shock absorbing device interconnecting said load transmitting assembly and the other of said axle beam members, and an actuable positioning means connected between said pivoted load transmitting assembly and said strut having an operative connection with said shock absorbing device whereby the latter may actuate said positioning means to rotate said load transmitting assembly to move said forwardly extending axle beam member relative to the other axle beam member.

16. An aircraft landing device comprising a strut adapted for connection to the aircraft, a pair of relatively movable axle beam members, each of said axle beam members having one end pivotally connected to said strut at its lower end and having wheel means rotatably supported thereon spaced from said connection, a load transmitting assembly pivotally mounted on said strut, said load transmitting device comprising a pair of lever members, in parallel, pivotally supported, intermediate their ends on said strut, one on each side thereof and a pair of transverse tie beam members joining the free ends of said lever members for common movement, a rigid link member disposed forward of said strut having one end pivotally connected to the axle beam member which extends forwardly from the strut and the other end connected to a tie beam of said load transmitting assembly, a shock absorbing strut mounted aft of said strut comprising telescoping members, with one of said telescoping members having a pivotal connection with the axle beam member which extends rearward of the strut, and the other telescoping member having a pivotal connection with the second of said tie beams of said load transmitting assembly, an actuable positioning device interconnected between said second tie beam and said strut having an operative connection with said shock absorbing device whereby the latter may actuate said positioning device to rotate said load transmitting assembly to move said forwardly extending axle beam member relative to said rearwardly extending axle beam member.

17. In a landing gear for aircraft, the combination of a main strut, a pair of relatively movable axle beam members, each of said axle beam members having one end pivotally connected to said main strut at its lower end and having wheel means rotatably supported at the other end, a rigid link member having one end pivotally connected to an axle beam member which extends forwardly from said main strut intermediate the ends thereof, a shock absorbing device pivotally connected at one end to the axle beam member which extends rearwardly of the main strut and between the ends thereof, means interconnecting the other ends of said rigid link member and said shock absorbing device, said means comprising elongated means, said load transmitting assembly comprising a pair of lever members, pivot means for mounting said lever members on said strut for pivotal movement about an axis which is transverse of and spaced from the longitudinal axis of said strut, said pivot means connecting to said lever members off-center of the lengths thereof, and an actuable positioning device connected between said pivoted load transmitting assembly and said strut having an operative connection with said shock absorbing device whereby the latter may actuate said positioning device to rotate said load transmitting assembly to move said forwardly extending axle beam member relative to the rearwardly extending axle beam member.

18. An aircraft landing gear comprising a strut adapted for connection to the aircraft, a pair of relatively movable axle beam members, each of said axle beam members having one end pivotally connected to said strut at its lower end and each having wheel means rotatably supported at the other end, a load transmitting assembly pivotally mounted on said strut, said load transmitting device comprising a pair of lever members disposed one on each side of said strut, pivot means operatively connected to said lever members off-center thereof for pivotally mounting, in parallel, said lever members upon said strut for pivotal movement about an axis transverse to and spaced from the longitudinal axis thereof, and a pair of transverse tie beam members joining the free ends of said lever members for common movement, a rigid link member disposed forward of said strut having one end pivotally connected to the axle beam member which extends forwardly from said strut and the other end connected to a tie beam of said load transmitting assembly, a shock absorbing strut mounted aft of said strut comprising telescoping members, with one of said members having a pivotal connection with the axle beam member which extends rearwardly from said strut, and the other member having a pivotal connection with the second of said tie beams of said load transmitting assembly, an actuable positioning device interconnected between said second tie beam and said strut having an operative connection with said shock absorbing device whereby the latter may actuate said positioning device to rotate said load transmitting assembly to move said forwardly extending axle beam member relative to said rearwardly extending axle beam member.

WENDELL E. ELDRED.

REFERENCES CITED

The following references are of record in the file of this patent:

UNITED STATES PATENTS

| Number | Name | Date |
|---|---|---|
| 2,065,532 | Knox et al. | Dec. 29, 1936 |
| 2,130,914 | Warren | Sept. 20, 1938 |
| 2,281,351 | Dowty | Apr. 28, 1942 |

FOREIGN PATENTS

| Number | Country | Date |
|---|---|---|
| 595,701 | Germany | Apr. 19, 1934 |